United States Patent
Jung et al.

(10) Patent No.: US 10,951,259 B2
(45) Date of Patent: Mar. 16, 2021

(54) METHOD FOR SIMULTANEOUSLY TRANSMITTING/RECEIVING UPSTREAM AND DOWNSTREAM SIGNALS USING REMOTE PHY ARCHITECTURE AND APPARATUS FOR THE SAME

(71) Applicant: Electronics and Telecommunications Research Institute, Daejeon (KR)

(72) Inventors: Joon-Young Jung, Daejeon (KR); Tae-Kyoon Kim, Daejeon (KR); Eun-Hee Hyun, Daejeon (KR); Heung-Mook Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 61 days.

(21) Appl. No.: 16/131,388

(22) Filed: Sep. 14, 2018

(65) Prior Publication Data

US 2019/0132022 A1 May 2, 2019

(30) Foreign Application Priority Data

Oct. 30, 2017 (KR) .................. 10-2017-0142652
Feb. 6, 2018 (KR) .................. 10-2018-0014758

(51) Int. Cl.
*H04B 1/525* (2015.01)
*H04L 5/14* (2006.01)
(Continued)

(52) U.S. Cl.
CPC .......... *H04B 1/525* (2013.01); *H04B 10/5165* (2013.01); *H04B 17/345* (2015.01);
(Continued)

(58) Field of Classification Search
CPC ..... H04W 72/04; H04W 88/08; H04W 76/00; H04W 72/082; H04B 1/525; H04L 5/1423
See application file for complete search history.

(56) References Cited

U.S. PATENT DOCUMENTS 8,060,020 B2    11/2011  Kim et al.
9,966,993 B2 *   5/2018  Jin ........................ H04B 3/20
(Continued)

FOREIGN PATENT DOCUMENTS

KR    10-2010-0064285 A    6/2010
KR       10-1715503 B1    3/2017
KR    10-2017-0061087 A    6/2017

*Primary Examiner* — Hassan A Phillips
*Assistant Examiner* — Prenell P Jones
(74) *Attorney, Agent, or Firm* — NSIP Law

(57) ABSTRACT

Disclosed herein are a method for simultaneously transmitting/receiving upstream and downstream signals using a remote PHY architecture and an apparatus for the same. The method determines whether to divide frequencies depending on whether signal interference occurs among multiple cable modems connected to a cable network, if it is determined to divide the frequencies, categorize the multiple cable modems into multiple groups so that signal interference occurs in each group, but signal interference does not occur between groups, set transmission bands for the multiple groups so that an upstream band and a downstream band of one group alternate with upstream bands and downstream bands of remaining groups by dividing the frequencies in accordance with a number of groups, and cancels, by a remote physical layer (PHY) device located at an optical network terminal of the cable network, self-interference signals for respective groups based on the transmission bands.

18 Claims, 14 Drawing Sheets

(51) Int. Cl.
*H04B 17/345* (2015.01)
*H04B 10/516* (2013.01)
*H04L 5/00* (2006.01)
*H04B 17/391* (2015.01)
*H04W 72/08* (2009.01)

(52) U.S. Cl.
CPC ........... *H04B 17/391* (2015.01); *H04L 5/005* (2013.01); *H04L 5/1423* (2013.01); *H04W 72/082* (2013.01)

(56) References Cited

U.S. PATENT DOCUMENTS

| | | | |
|---|---|---|---|
| 10,491,249 B2 * | 11/2019 | Hewavithana | H04L 12/2801 |
| 2007/0008927 A1 * | 1/2007 | Herz | H04L 45/00 |
| | | | 370/331 |
| 2009/0064112 A1 * | 3/2009 | Inagaki | G06F 8/441 |
| | | | 717/140 |
| 2014/0010269 A1 * | 1/2014 | Ling | H04B 3/46 |
| | | | 375/222 |
| 2016/0072578 A1 * | 3/2016 | Jin | H04L 43/0882 |
| | | | 398/36 |
| 2016/0087698 A1 | 3/2016 | Chang et al. | |
| 2016/0119857 A1 * | 4/2016 | Mohan | H04W 48/00 |
| | | | 455/434 |
| 2017/0019241 A1 * | 1/2017 | Jin | H04L 5/1461 |
| 2017/0019242 A1 * | 1/2017 | Jin | H04L 5/1461 |
| 2018/0294941 A1 * | 10/2018 | Chapman | H04B 3/32 |
| 2018/0331814 A1 * | 11/2018 | Khandani | H04L 5/1461 |
| 2018/0343033 A1 * | 11/2018 | Sun | H04B 3/487 |
| 2019/0044555 A1 * | 2/2019 | Hewavithana | H04B 1/0475 |
| 2019/0149186 A1 * | 5/2019 | Choi | H04L 5/14 |
| | | | 370/278 |

* cited by examiner

METHOD FOR SIMULTANEOUSLY TRANSMITTING/RECEIVING UPSTREAM AND DOWNSTREAM SIGNALS USING REMOTE PHY ARCHITECTURE AND APPARATUS FOR THE SAME

CROSS REFERENCE TO RELATED APPLICATIONS

This application claims the benefit of Korean Patent Application Nos. 10-2017-0142652, filed Oct. 30, 2017 and 10-2018-0014758, filed Feb. 6, 2018, which are hereby incorporated by reference in their entirety into this application.

BACKGROUND OF THE INVENTION

1. Technical Field

The present invention relates generally to technology for simultaneously transmitting/receiving upstream and downstream signals, and more particularly, to technology for simultaneously transmitting/receiving upstream Radio Frequency (RF) signals and downstream RF signals in the same frequency band using a remote physical layer (PHY) architecture in order to solve the problem of insufficiency of an upstream frequency band in a cable broadcasting network based on an interactive service.

2. Description of the Related Art

A cable broadcasting network provides a communication service using cable modems based on media characteristics that support bidirectional communication including a typical broadcasting service. Generally, bidirectional transmission on wired media uses Time-Division Duplexing (TDD) or Frequency-Division Duplexing (FDD). TDD is a scheme for dividing the same frequency band into time slots and alternately transmitting downstream signals and upstream signals during an interval corresponding to a predetermined time. FDD is a scheme for dividing a frequency band and simultaneously transmitting downstream signals and upstream signals.

A typical cable broadcasting network is configured using a Hybrid Fiber-Coax (HFC) network, as illustrated in FIG. 1. The structure of an HFC network is generally configured such that sections from an optical transceiver included in a distribution center (headend) 110 to outdoor Optical Node Units (ONUs) 120 are optical transmission sections and have a star structure, as illustrated in FIG. 1. Further, sections from each outdoor ONU to multiple subscriber terminals (e.g. cable modems: CM) 130-1 to 130-N are coaxial transmission sections, and have a tree-and-branch structure in which RF signals are transmitted to subscriber terminals through an amplifier, a splitter, a directional coupler, a tap-off device, etc.

In such a cable broadcasting network, bidirectional transmission is based on Frequency-Division Duplexing (FDD). However, the size of an upstream frequency band allocated to transmit upstream signals is much smaller than that of a downstream frequency band allocated to transmit downstream signals, and thus asymmetric transmission between upstream and downstream frequency bands inevitably occurs. For example, as illustrated in FIG. 2, a cable broadcasting network uses a frequency band ranging to about 1 GHz and has an upstream/downstream asymmetric structure in which a relatively narrow band is allocated for upstream transmission because most of the frequency band is used for downstream transmission. In this case, the frequencies of the cable broadcasting network are divided into a low-split band, a mid-split band, and a high-split band depending on the boundary location between a frequency band for upstream signals and a frequency band for downstream signals.

Frequencies in upstream and downstream bands, which are used in most cable broadcasting networks, are based on a low-split band or a mid-split band, and the upstream band occupies a portion amounting to $\frac{1}{10}$ or less of the entire usage band. Most initial services provided over a cable broadcasting network are unidirectional broadcasting services based on downstream signals, and thus the portion occupied by the upstream band is less than that of the downstream band. Therefore, most frequencies are conventionally allocated to the downstream band rather than to the upstream band.

However, with the activation of high-speed Internet services through cable modems and an increase in the consumption of personal media, demand for extension of the upstream band has gradually increased. To reflect this trend, an upstream band has recently extended to a high-split band. In spite of this, the problem of differences in transmission capacity and speed between upstream and downstream bands resulting from upstream/downstream asymmetry are not yet solved. The extension of the upstream band results in the reduction of the downstream band, and the most of the downstream band is already used to provide multi-channel broadcasting services and communication services, thus making it difficult to further extend the upstream band. In connection with this, Korean Patent Application Publication No. 10-2017-0061087 discloses a technology related to "Self-Interference Cancellation Circuit and In-Band Full Duplex Transceiver".

SUMMARY OF THE INVENTION

Accordingly, the present invention has been made keeping in mind the above problems occurring in the prior art, and an object of the present invention is to extend an upstream band without reducing a downstream band for a cable broadcasting network.

Another object of the present invention is to provide technology for doubling the frequency use efficiency of a cable broadcasting network.

A further object of the present invention is to secure competitiveness for a cable broadcasting network and to facilitate the provision of a new service, such as a high-quality broadcasting service and a Giga-level high-speed Internet service.

In accordance with an aspect of the present invention to accomplish the above objects, there is provided a method for simultaneously transmitting upstream and downstream signals, including determining whether to divide frequencies depending on whether signal interference occurs among multiple cable modems connected to a cable network; if it is determined to divide the frequencies, categorizing the multiple cable modems into multiple groups so that signal interference occurs in each group, but signal interference does not occur between groups; dividing the frequencies in accordance with a number of the groups, and setting transmission bands for the multiple groups so that an upstream band of one group of the multiple groups overlaps with a downstream band of another group of the multiple groups; and cancelling, by a remote physical layer (PHY) device located at an optical network terminal of the cable network, self-interference signals for respective groups based on the transmission bands.

The method may further include, if it is determined not to divide the frequencies, cancelling, by the remote PHY device, self-interference signals for respective cable modems based on a single transmission band corresponding to the frequencies; and cancelling, by each of the multiple cable modems, a self-interference signal occurring in a corresponding cable modem.

The frequencies may be divided when signal interference caused by self-interference signals occurs among the multiple cable modems.

The remote PHY device may be configured to detect at least one of the self-interference signals for respective groups and self-interference signals for respective cable modems by comparing a first downstream signal that does not pass through the cable network with a second downstream signal that is input after being combined with an upstream signal based on a circulator.

Cancelling, by each of the multiple cable modems, the self-interference signal occurring in the corresponding cable modem may be configured to cancel the self-interference signal by comparing a first upstream signal that does not pass through the cable network with a second upstream signal that is input after being combined with a downstream signal based on a circulator included in each of the multiple cable modems.

The remote PHY device may be connected to the multiple cable modems over a passive coaxial network that does not include an amplifier.

Whether the signal interference occurs may be determined such that, while any one of the multiple cable modems is transmitting an upstream signal, remaining cable modems other than the one cable modem check whether a self-interference signal caused by the upstream signal is detected.

The upstream signal may be transmitted to the remote PHY device in a preset time slot allocated to each of the multiple cable modems by a system core, located at a headend of the cable network.

The system core may include functions of a Media Access Control (MAC) layer or higher layers, and the remote PHY device may include functions of a physical layer.

In accordance with another aspect of the present invention to accomplish the above objects, there is provided an apparatus for simultaneously transmitting upstream and downstream signals, including a system core configured to determine whether to divide frequencies depending on whether signal interference occurs among multiple cable modems connected to a cable network, and if it is determined to divide the frequencies, categorize the multiple cable modems into multiple groups so that signal interference occurs in each group, but signal interference does not occur between groups, and configured to set transmission bands for the multiple groups so that an upstream band of one group of the multiple groups overlaps with a downstream band of another group of the multiple groups, the system core being located at a headend of the cable network; and a remote PHY device located at an optical network terminal of the cable network and configured to cancel self-interference signals for respective groups based on the transmission bands.

The remote PHY device may be configured to, if it is determined not to divide the frequencies, cancel self-interference signals for respective cable modems based on a single transmission band corresponding to the frequencies, and each of the multiple cable modems may cancel a self-interference signal occurring in a corresponding cable modem.

The frequencies may be divided when signal interference caused by self-interference signals occurs among the multiple cable modems.

The remote PHY device may detect at least one of the self-interference signals for respective groups and self-interference signals for respective cable modems by comparing a first downstream signal that does not pass through the cable network with a second downstream signal that is input after being combined with an upstream signal based on a circulator.

Each of the multiple cable modems may cancel the self-interference signal by comparing a first upstream signal that does not pass through the cable network with a second upstream signal that is input after being combined with a downstream signal based on a circulator.

The remote PHY device may be connected to the multiple cable modems over a passive coaxial network that does not include an amplifier.

Whether the signal interference occurs may be determined such that, while any one of the multiple cable modems is transmitting an upstream signal, remaining cable modems other than the one cable modem check whether a self-interference signal caused by the upstream signal is detected.

The upstream signal may be transmitted to the remote PHY device in a preset time slot allocated to each of the multiple cable modems by the system core.

The system core may include functions of a Media Access Control (MAC) layer or higher layers, and the remote PHY device may include functions of a physical layer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
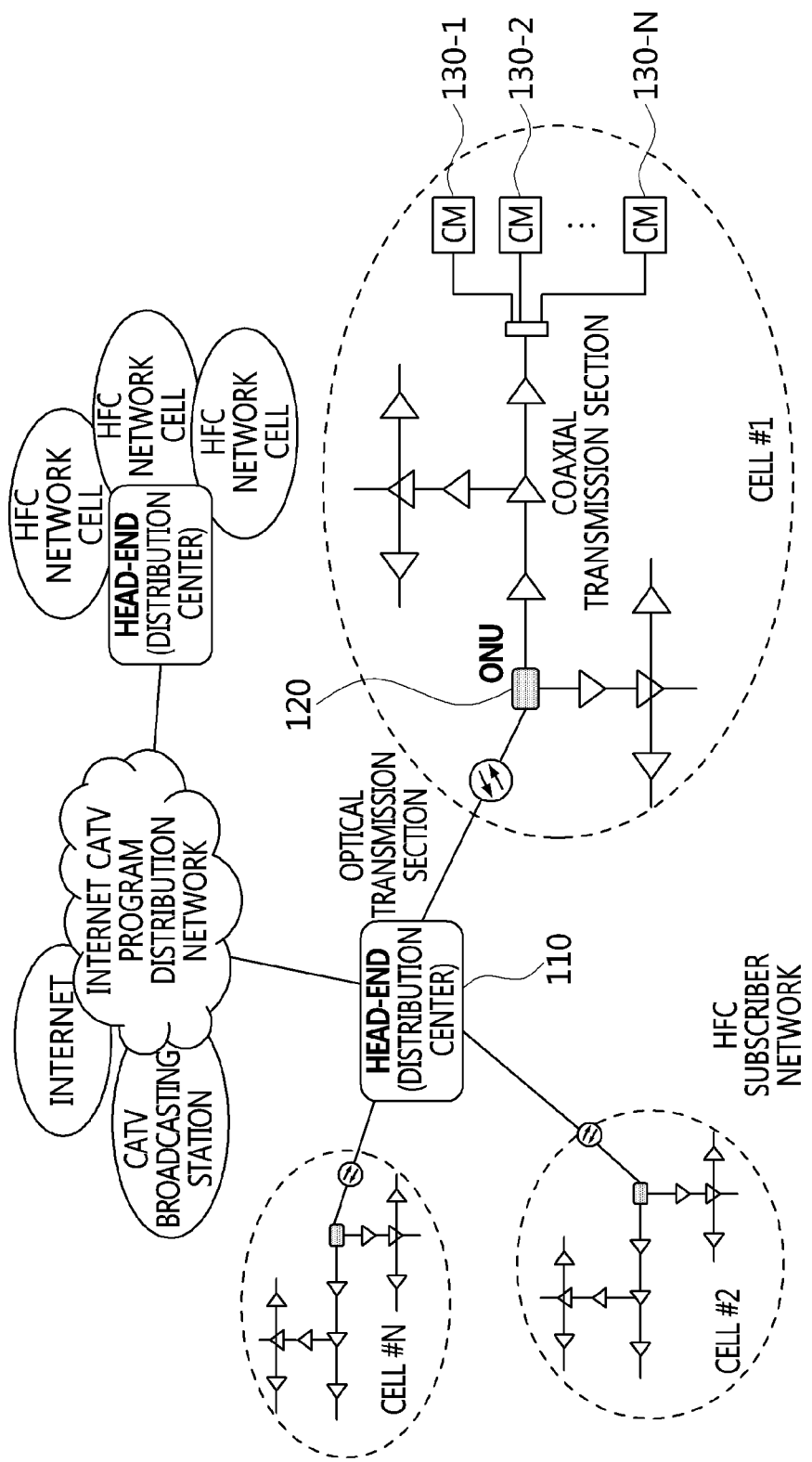
FIG. 1 is a diagram illustrating the configuration of a cable broadcasting network.
Figure 2:
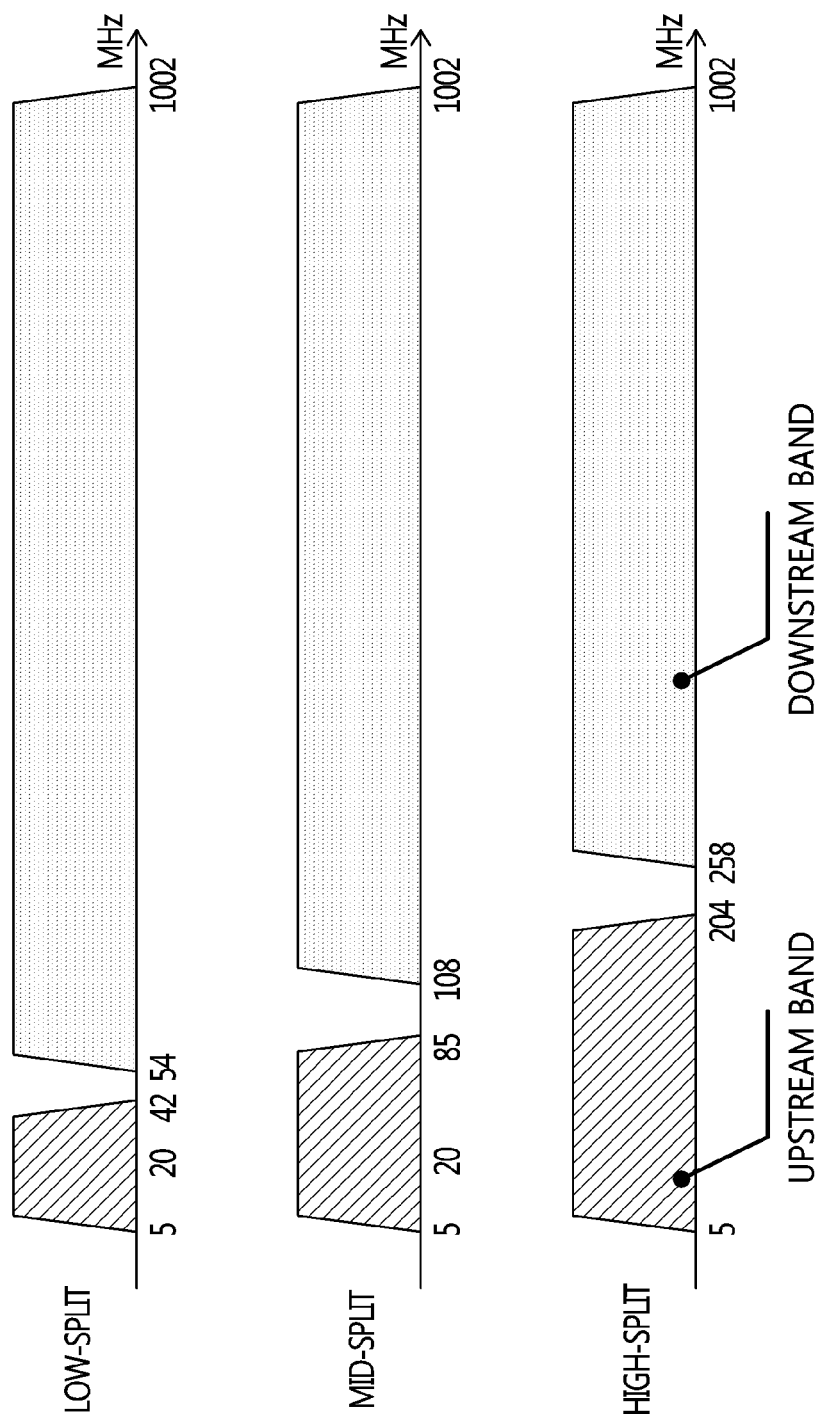
FIG. 2 is a diagram illustrating an example of frequency usage of a cable broadcasting network.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 3:
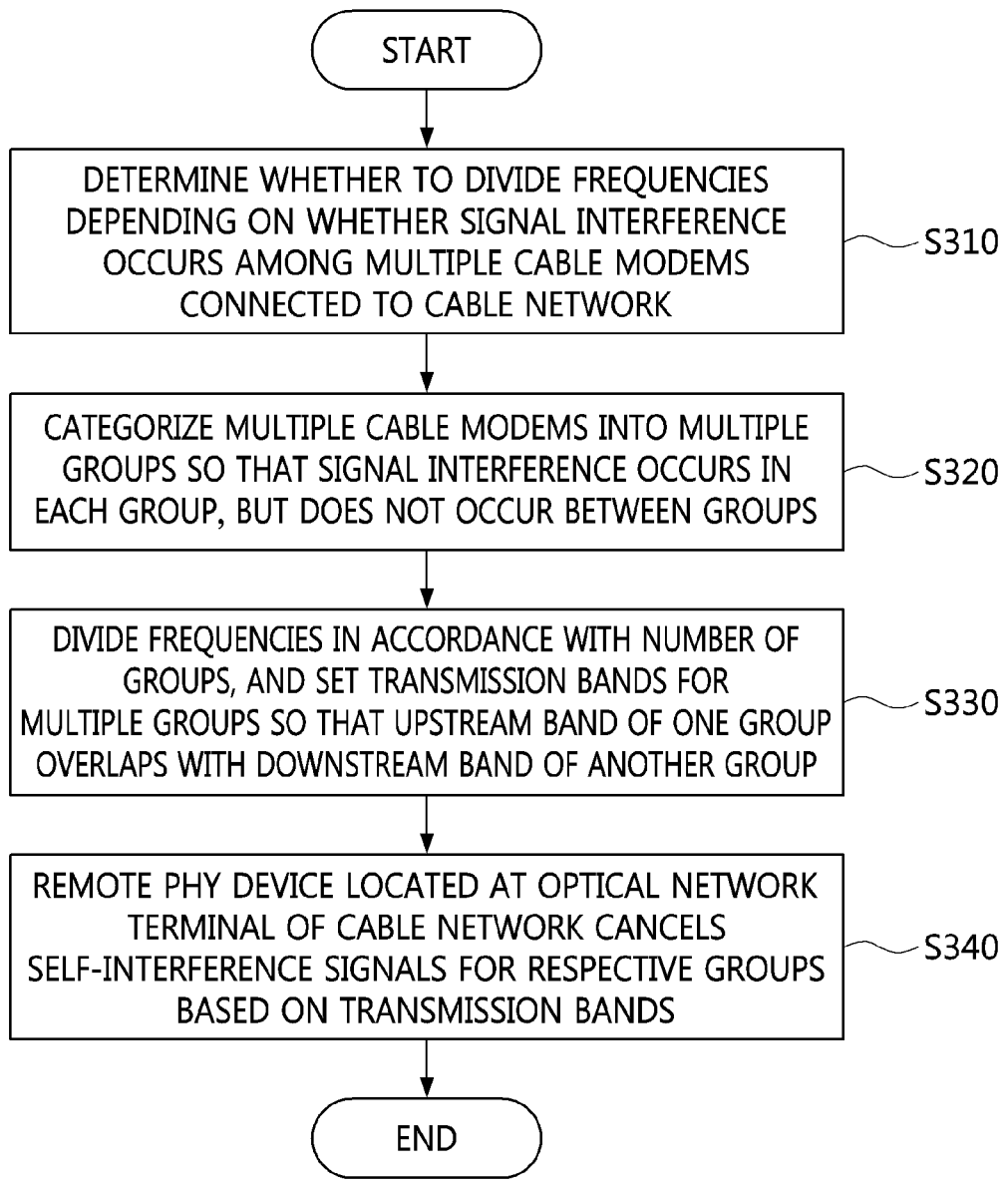
FIG. 3 is an operation flowchart illustrating a method for simultaneously transmitting/receiving upstream and downstream signals using a remote PHY architecture according to an embodiment of the present invention.

FIG. 3 is an operation flowchart illustrating a method for simultaneously transmitting/receiving upstream and downstream signals using a remote PHY architecture according to an embodiment of the present invention.

Referring to FIG. 3, the method for simultaneously transmitting/receiving upstream and downstream signals using a remote PHY architecture according to the embodiment of the present invention determines whether to divide frequencies depending on whether signal interference occurs between multiple subscriber terminals (e.g. cable modems: CM) connected to a cable network at step S310.

Here, each of frequency bands generated by performing frequency division may be used as a transmission band in which upstream and downstream signals are simultaneously used so that upstream and downstream signals from different cable modem groups are simultaneously used, rather than being used as a signal band for any one of an upstream signal and a downstream signal. That is, frequency division according to the present invention may be division depending on whether frequencies in the entire frequency band are to be simultaneously used without separation, or whether frequencies are to be efficiently divided and simultaneously used when there are groups.

Figure 4:
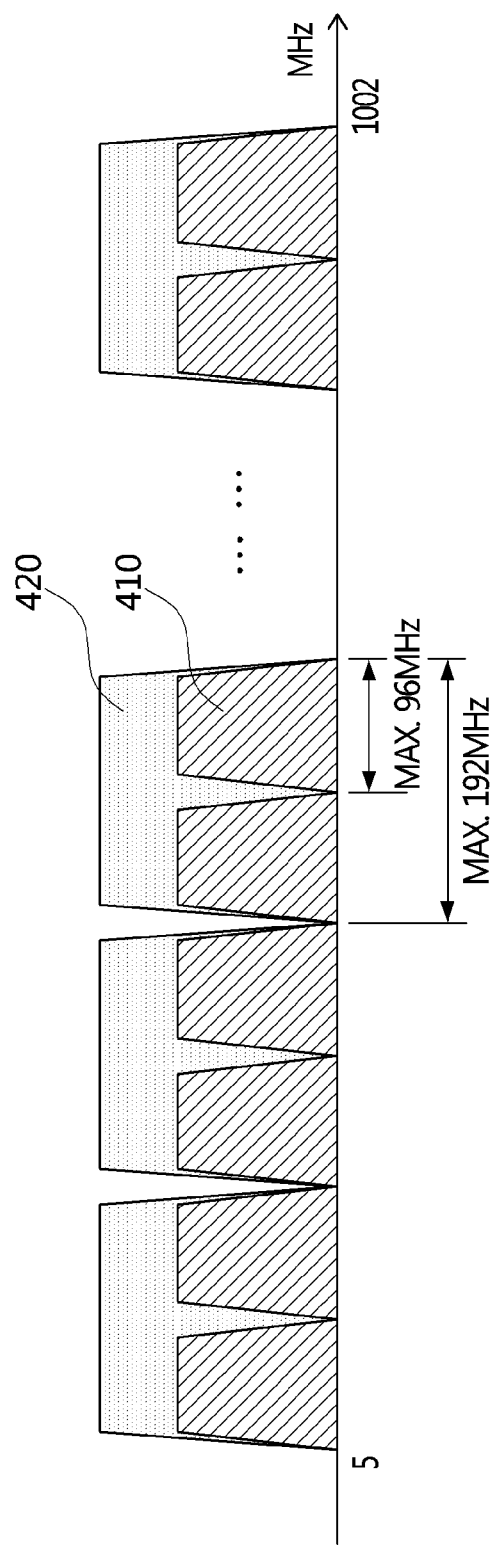
FIG. 4 is a diagram illustrating an example in which an upstream band and a downstream band use the same frequency band according to the present invention.

For example, as shown in FIG. 4, an upstream band 410 in which upstream signals are transmitted and a downstream band 420 in which downstream signals are transmitted are simultaneously used in the entire frequency band, and thus frequency use efficiency may be doubled. In this case, for efficiency in which signal interference between groups is taken into consideration, divided transmission bands may be allocated depending on cable modem groups.

Here, frequencies may be divided when signal interference attributable to a self-interference signal occurs between multiple cable modems.

Here, a self-interference signal may be a signal produced due to interference caused by a downstream signal when a Cable Modem Termination System (CMTS) receives an upstream signal transmitted from a cable modem (CM) in the same frequency band simultaneously with the downstream signal. Therefore, in order for the upstream signal and the downstream signal to simultaneously use the same frequency, the self-interference signal must be cancelled.

Here, whether signal interference occurs may be determined in such a way that, while any one of multiple cable modems is transmitting an upstream signal, the remaining cable modems other than the one cable modem check whether a self-interference signal caused by an upstream signal is detected.

Figure 5:
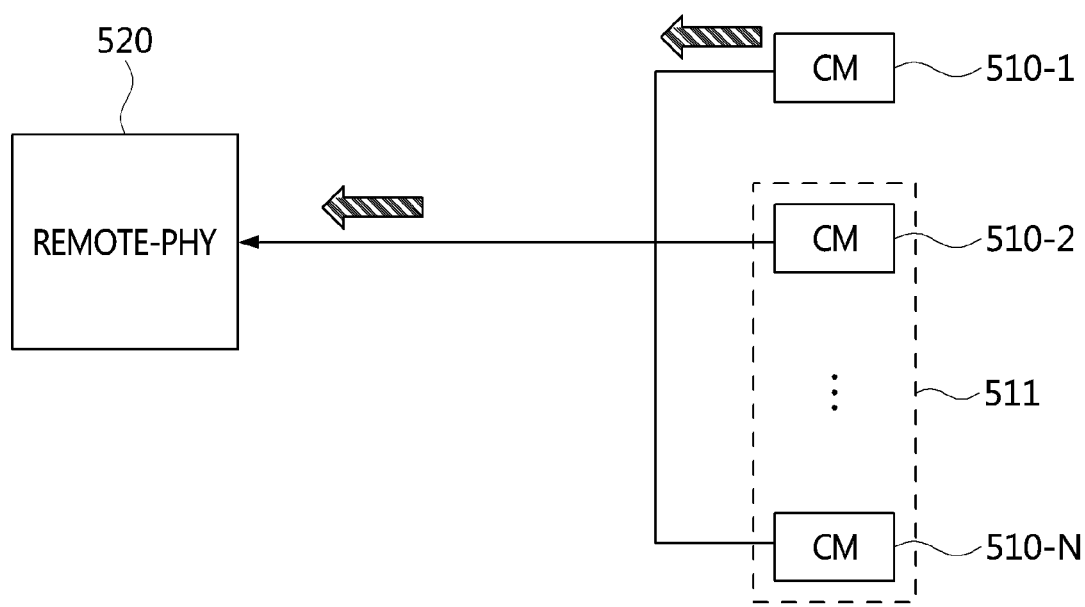
FIG. 5 is a diagram illustrating an example in which whether signal interference occurs is determined according to the present invention.

For example, referring to FIG. 5, a sequential check may be performed on multiple cable modems CM 510-1 to 510-N which are connected to a remote physical layer (PHY) device 520 according to the embodiment of the present invention based on a coaxial network. First during a time period from time t to time t+1, the first cable modem 510-1 may be commanded to generate an upstream signal. Here, the remaining cable modems 511 other than the first cable modem 510-1, among the multiple cable modems 510-1 to 510-N, may check whether a self-interference signal is detected during the time period from time t to time t+1, in which the first cable modem 510-1 generates an upstream signal. In this case, when any cable modem in which a self-interference signal is detected is present among the remaining cable modems 511 during the time period from time t to time t+1, it may be determined that signal interference occurs among the multiple cable modems, and frequencies may be divided.

Here, during the time period from time t to time t+1, when no terminal in which a self-interference signal is detected is present among the remaining cable modems 511, the same procedure may be performed on the second cable modem 510-2. For example, the second cable modem 510-2 may be commanded to generate an upstream signal during a time period from time t+1 to time t+2, and the first cable modem 510-1, instead of the second cable modem 510-2, may be included in the remaining cable modems 511.

In this way, if a self-interference signal is detected in the remaining cable modems while the same procedure is performed on the multiple cable modems 510-1 to 510-N, the frequency band may be divided and used.

Further, if it is determined to divide frequencies, the method for simultaneously transmitting/receiving upstream and downstream signals using a remote PHY architecture according to the embodiment of the present invention may categorize multiple cable modems into multiple groups so that signal interference occurs in each group, but does not occur between groups at step S320.

Figure 6:
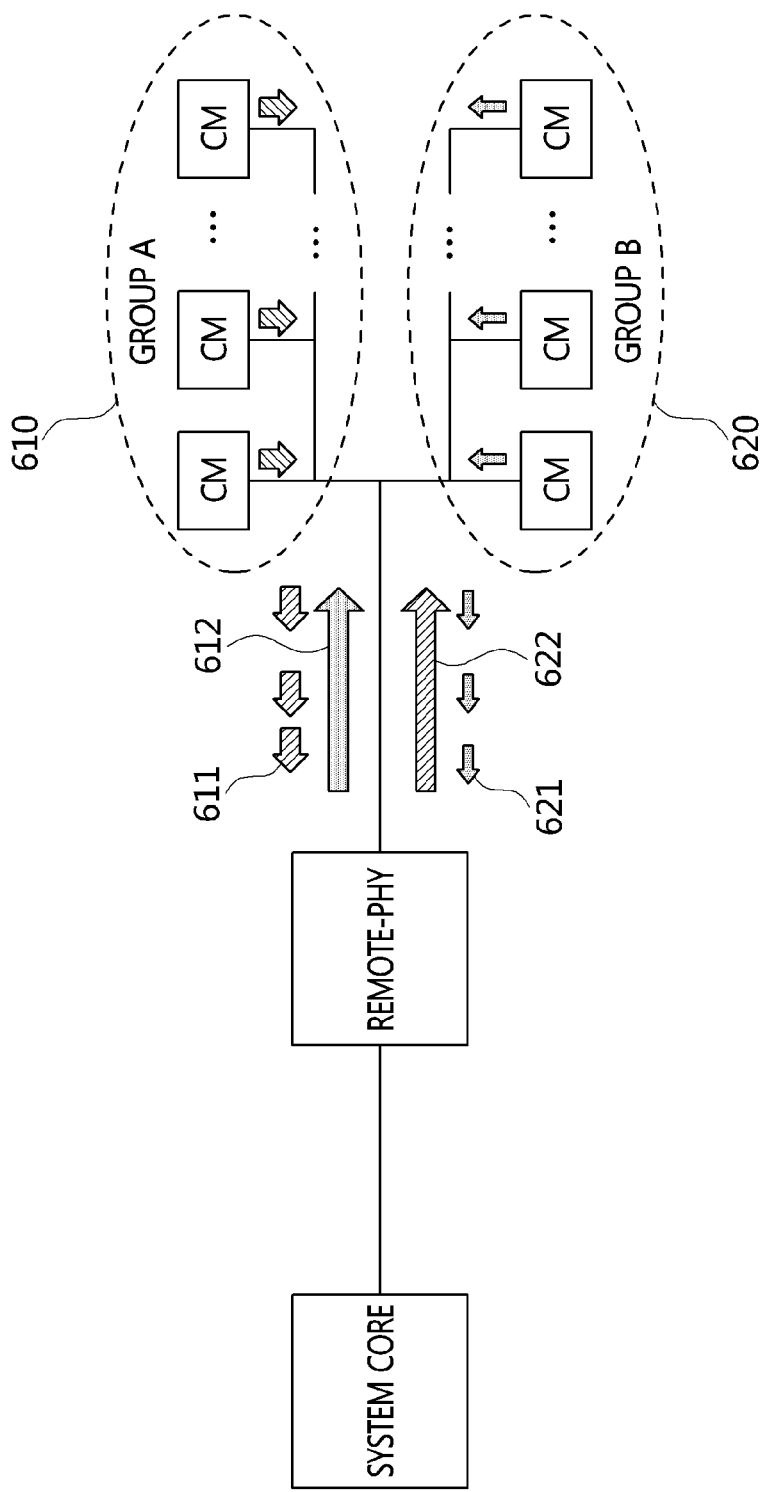
FIG. 6 is a diagram illustrating an example in which multiple subscriber terminals are grouped according to the present invention.

For example, referring to FIG. 6, it can be seen that multiple cable modems included in the cable network are categorized into two groups corresponding to group A 610 and group B 620. Here, a self-interference signal may not be produced between the group A 610 and the group B 620.

Here, the Cable Modem Termination System (CMTS) may determine whether to perform grouping, and may then perform grouping. For example, when cable modems in which signal interference does not occur are present among multiple cable modems and then grouping is possible, grouping may be performed.

If there is no cable modem in which signal interference does not occur, among the multiple cable modems, that is, if all cable modems produce self-interference signals, any one of a conventional FDD scheme and a conventional TDD scheme may be used.

Here, the group A 610 and the group B 620 may be generated by grouping cable modems in which a self-interference signal is detected during the procedure for checking whether signal interference occurs, illustrated in FIG. 5. That is, when any one of cable modems belonging to the group A 610 transmits an upstream signal, a self-interference signal may be detected in the remaining cable modems belonging to the group A 610. The group B 620 may also be generated through grouping in the same way.

Next, the method for simultaneously transmitting/receiving upstream and downstream signals using a remote PHY architecture according to the embodiment of the present invention divides frequencies in accordance with the number of groups, and sets transmission bands for multiple groups so that an upstream band and a downstream band of one group alternate with those of other groups at step S330.

Figure 7:
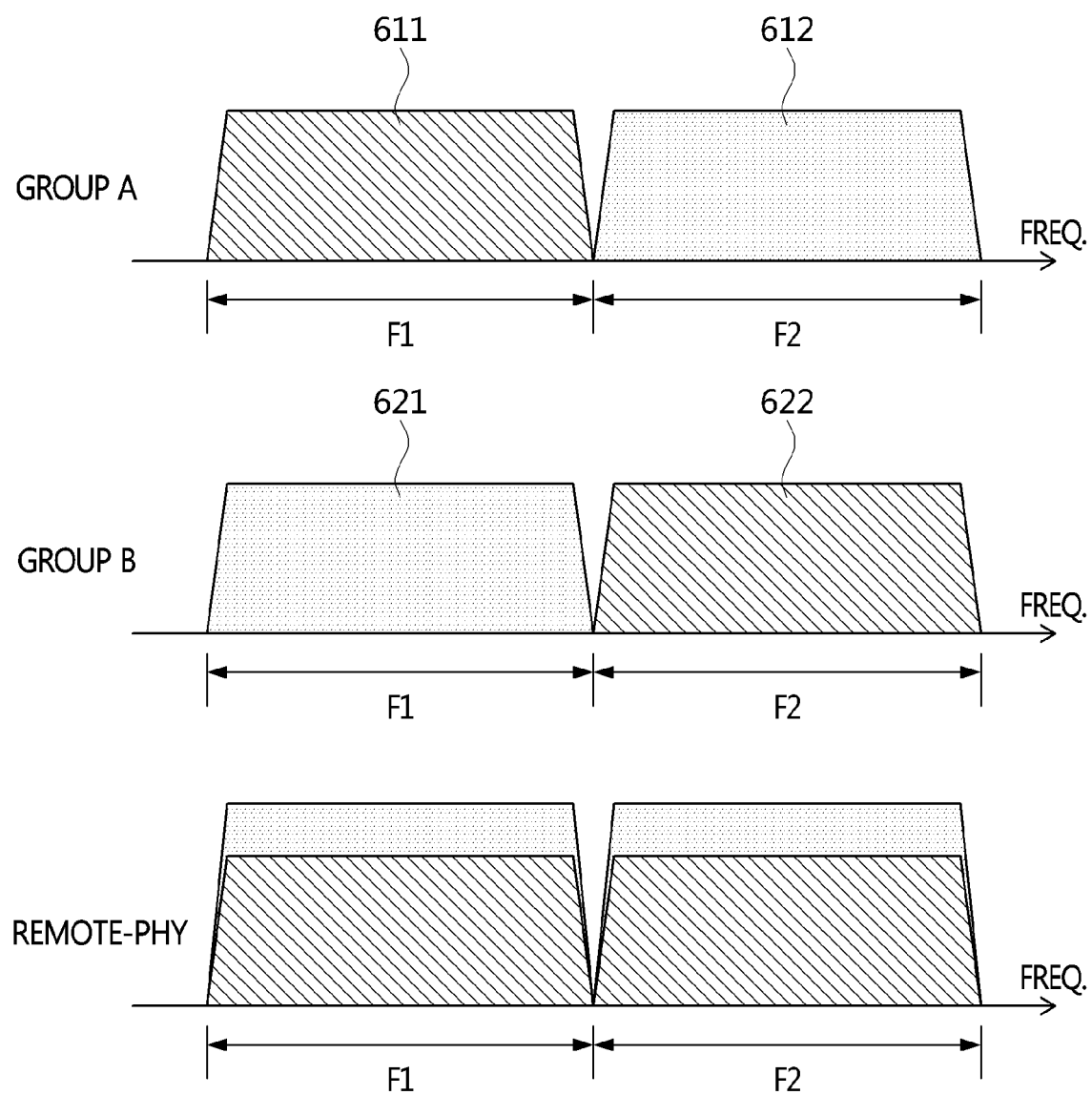
FIGS. 7 and 8 are diagrams illustrating an example of transmission bands set to alternate with each other for respective groups according to the present invention.

For example, referring to FIGS. 6 and 7, upstream bands and downstream bands of the group A 610 and the group B 620 may be set to alternate with each other. Here, as illustrated in FIG. 7, a system core may allocate a frequency band F1 to the group A 610 as a group A upstream band 611 for transmitting an upstream signal, and may allocate a frequency band F2 to the group A 610 as a group A downstream band 612 for transmitting a downstream signal. In contrast, the system core may allocate the frequency band F2 to the group B 620 as a group B upstream band 621 for transmitting an upstream signal, and may allocate the frequency band F1 to the group B 620 as a group B downstream band 622 for transmitting a downstream signal.

In this case, as illustrated in FIG. 6, the upstream signal of the group A 610 and the downstream signal of the group B 620 use the same frequency band, and the downstream signal of the group A 610 and the upstream signal of the group B 620 use the same frequency band, but signal interference is not present between the groups, and thus no problem may arise in signal transmission/reception. That is, upstream signals generated from cable modems belonging to the group A 610 may not interfere with the reception of downstream signals by cable modems belonging to the group B 620. Similarly, upstream signals generated from the cable modems belonging to the group B 620 may not interfere with the reception of downstream signals by the cable modems belonging to the group A 610.

However, in the case of the remote PHY device according to an embodiment of the present invention, a downstream signal having the frequency band F1, transmitted to the group B 620, causes interference when an upstream signal having the frequency band F1, transmitted from the group A 610, is received, and thus a self-interference signal for the frequency band F1 must be cancelled. Similarly, a downstream signal having the frequency band F2, transmitted to group A 610, causes interference when an upstream signal having the frequency band F2, transmitted from the group B 620, is received, and thus a self-interference signal for the frequency band F2 must be cancelled.

In this case, Frequency-Division Duplexing (FDD), in which an upstream signal and a downstream signal in each group use different frequencies, is applied to cable modems belonging to the group A 610 and to cable modems belonging to the group B 620, but it can be seen that the use of frequencies from the standpoint of the remote PHY device is implemented such that an upstream signal and a downstream signal are simultaneously applied in the same band. That is, since the upstream bands and the downstream bands of the group A 610 and the group B 620 are alternately used, it may be considered that an upstream signal and a downstream signal are simultaneously used in the same frequency band from the standpoint of overall frequency use.

Figure 8:
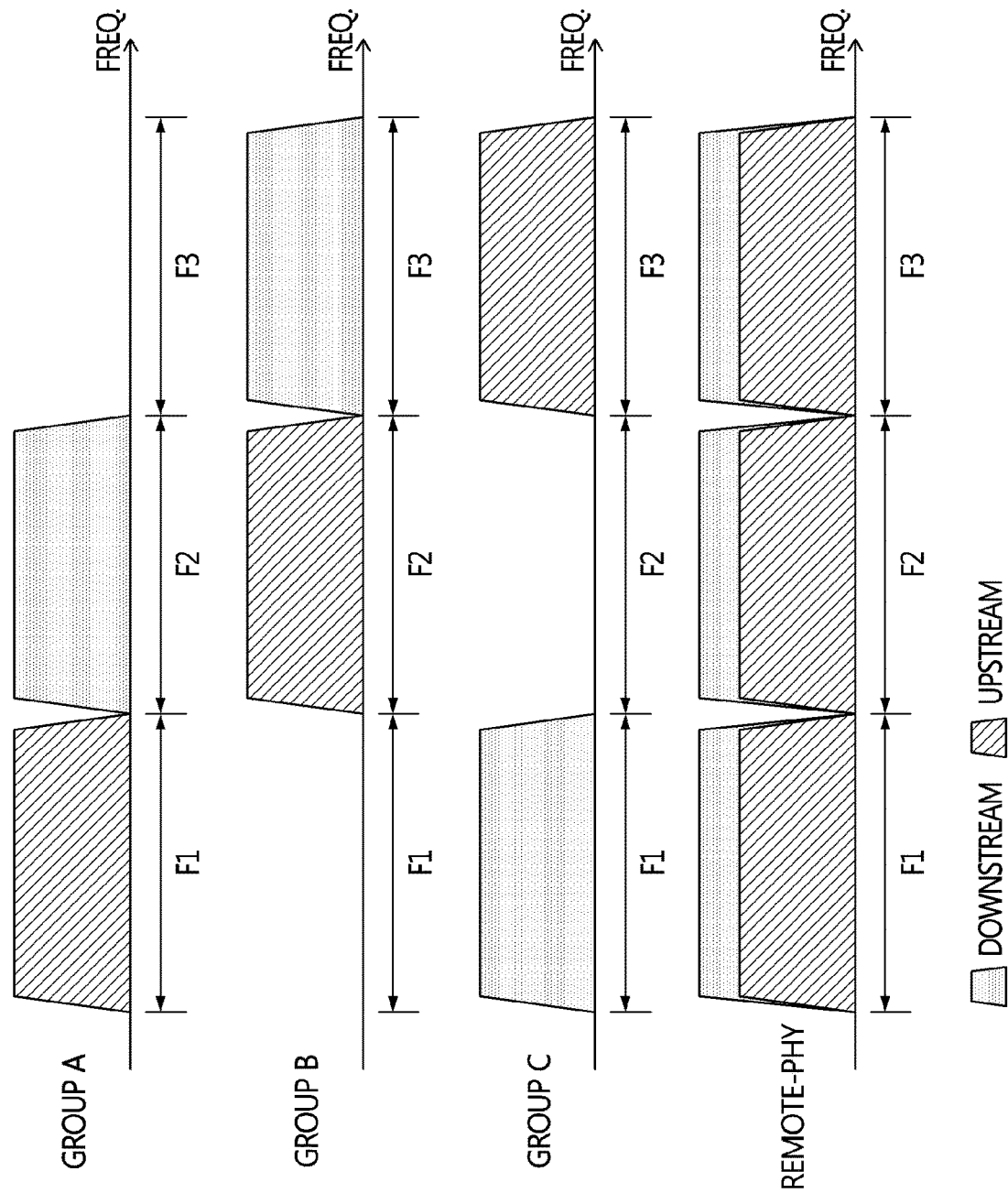

Here, in FIG. 7, multiple cable modems according to the embodiment of the present invention are categorized into two groups, but the number of groups is not limited thereto, and may be extended to three or more, as illustrated in FIG. 8.

Referring to FIG. 8, it can be seen that transmission bands are allocated such that upstream bands and downstream bands for three groups, that is, group A, group B, and group C, alternate with each other. That is, a frequency band F1 may be simultaneously used both as an upstream band of the group A and as a downstream band of the group C. Further, a frequency band F2 may be simultaneously used both as a downstream band of the group A and as an upstream band of the group B, and a frequency band F3 may be simultaneously used both as a downstream band of the group B and as an upstream band of the group C. Therefore, since signal interference is not present among the group A, the group B, and the group C, no problem may arise in signal transmission/reception.

However, in the case of the remote PHY device, a downstream signal having the frequency band F1, transmitted to the group C, causes interference when an upstream signal having the frequency band F1, transmitted from the group A, is received, and thus a self-interference signal for the frequency band F1 must be cancelled. Further, a downstream signal having the frequency band F2, transmitted to the group A, causes interference when an upstream signal having the frequency band F2, transmitted from the group B, is received, and thus a self-interference signal for the frequency band F2 must be cancelled. Finally, a downstream signal having the frequency band F3, transmitted to the group B, causes interference when an upstream signal having the frequency band F3, transmitted from the group C, is received, and thus a self-interference signal for the frequency band F3 must be cancelled.

Next, in the method for simultaneously transmitting/receiving upstream and downstream signals using a remote PHY architecture according to the embodiment of the present invention, a remote PHY device located at the Optical Network Terminal (ONT) of a cable network cancels self-interference signals for respective groups based on transmission bands at step S340.

Here, the remote PHY device may mean that functions of a Media Access Control (MAC) layer or higher layers in a conventional Cable Modem Termination System (CMTS) are located at a headend, and that only the functions of a physical layer are separated and located at a remote place.

Here, the remote PHY device and multiple cable modems may be connected to each other over a passive coaxial network that does not include an amplifier.

For example, in a typical cable broadcasting network, a CMTS is located at the headend and is connected to an Optical Node Unit (ONU), which is an outdoor optical transceiver, over an optical network. In this case, a structure downstream of the ONU is a coaxial network, which can be connected to a cable modem through an amplifier, a splitter, etc. However, since network equipment, such as an ONU and an amplifier used in an existing cable broadcasting network, supports an FDD scheme, it may be difficult to simultaneously transmit upstream and downstream signals in the same band according to the present invention.

Accordingly, in the present invention, in order to simultaneously use an upstream band and a downstream band in the entire frequency band, an ONU in the existing cable broadcasting network structure is replaced with a remote PHY device. Here, a network having no amplifier is configured between the remote PHY device and multiple cable modems. However, the distances between the remote PHY device and the multiple cable modems may be limited to a maximum of 300 m or less in consideration of the fact that recent cable broadcasting networks have developed into a fiber-deep architecture in which an optical fiber is extended as close to a subscriber as possible. That is, as cable broadcasting networks have developed into such a fiber-deep architecture, it is expected that the number of cable networks having no amplifier will be gradually increased, and thus the cable broadcasting network according to the present invention may be applied.

Here, the remote PHY device may detect self-inference signals for respective groups by comparing a first downstream signal, which has not passed through the cable network, with a second downstream signal, which is input after being combined with an upstream signal based on a circulator.

Figure 9:
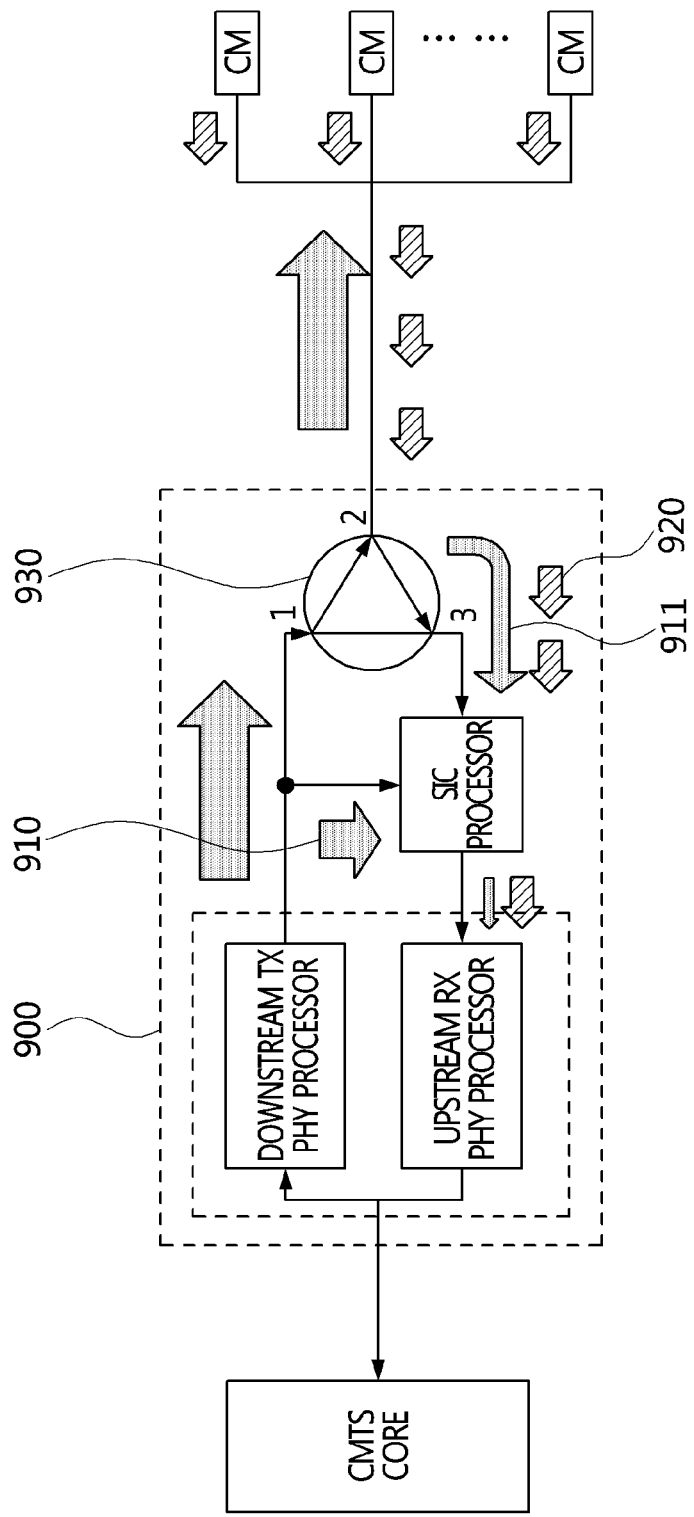
FIG. 9 is a diagram illustrating an example of the detailed configuration of a remote PHY device for cancelling a self-interference signal according to the present invention.

For example, referring to FIG. 9, the cancellation of self-interference signals by a remote PHY device 900 may be performed by comparing a first downstream signal 910, which is a reference signal that results from a downstream signal generated based on a processor included in the remote PHY device 900 and that does not pass through a cable network, with a second downstream signal 911, which is output to the cable network through a circulator 930 and is input after being combined with an upstream signal 920. That is, a self-interference signal is detected and cancelled based on the first downstream signal 910 and the second downstream signal 911, and thus interference occurring when the upstream signal is received may be cancelled.

In this case, as each downstream signal passes through elements having nonlinear distortion on a cable system, it may be difficult to completely cancel the self-interference signal, but the self-interference signal is cancelled to such an extent that an upstream signal can be received, thus enabling an upstream signal and a downstream signal to be simultaneously transmitted/received in the same band.

Here, the second downstream signal 911 may be detected through an estimation and modeling procedure. Here, the second downstream signal 911, which is input after being combined with the upstream signal 920, is decreased in magnitude while passing through the circulator 930, but it is not completely cancelled in spite of the decreased magnitude, and thus a self-interference signal for the second downstream signal 911 must be cancelled. For example, the cancellation of the self-interference signal may be performed in an analog domain or a digital domain.

As illustrated in FIG. 9, the remote PHY device 900 may communicate with multiple cable modems, and downstream signals transmitted from the remote PHY device 900 to the multiple cable modems may be transmitted as continuous signals. The multiple cable modems receive the same signal, but each of the multiple cable modems may perform signal processing so that, after signal processing in a physical layer, a Media Access Control (MAC) layer selects and receives only its own data.

However, unlike downstream signals, the upstream signals may be transferred in a burst mode, in which signals are transmitted in respective time slots allocated to the cable modems by a CMTS core.

In other words, upstream signals according to the present invention may be transmitted to the remote PHY device in respective time slots, which are allocated to multiple cable modems by the system core located at the headend of the cable network.

The system core may include functions of the MAC layer or higher layers, and the remote PHY device may include functions of the physical layer.

Here, the CMTS core illustrated in FIG. 9 may be the system core.

Each of the multiple cable modems may generally be a terminal device located in a subscriber's premises (e.g. house), rather than being expensive complicated equipment such as a Cable Modem Termination System (CMTS). Therefore, when a function for cancelling a self-interference signal is added to a cable modem, the expense of the terminal may be increased. Accordingly, as in the case of the present invention, a scheme for cancelling a self-interference signal is used only in the remote PHY device, and thus terminal installation costs to be borne by subscribers may be reduced.

Further, although not illustrated in FIG. 3, the method for simultaneously transmitting/receiving upstream and downstream signals using a remote PHY architecture according to the embodiment of the present invention is configured such that, if it is determined not to divide frequencies, the remote PHY device cancels self-interference signals for respective cable modems based on a single transmission band corresponding to frequencies, and the multiple cable modems cancel self-interference signals produced therein.

Figure 10:
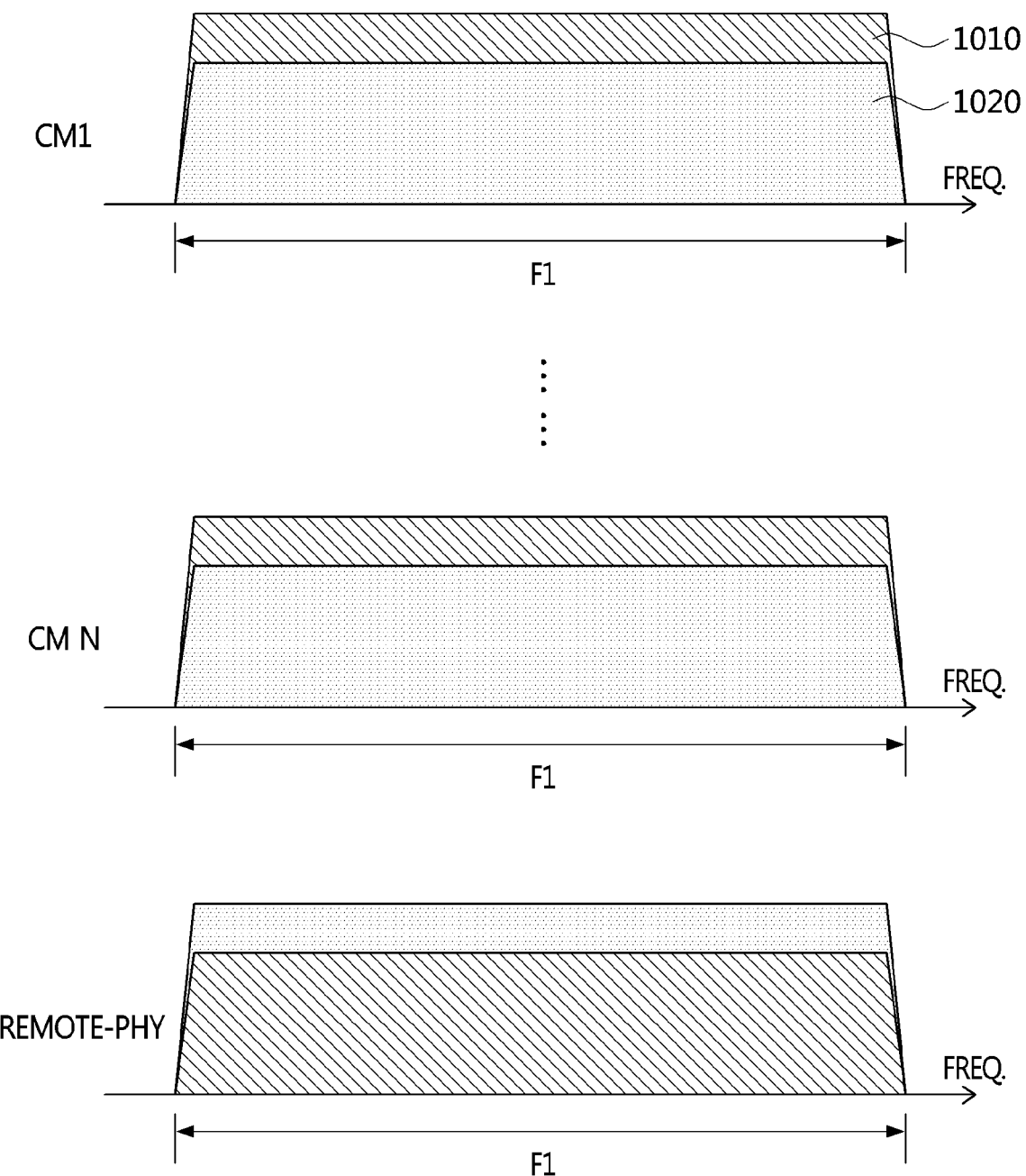
FIG. 10 is a diagram illustrating an example in which a single transmission band is used according to the present invention.

For example, if it is determined not to divide the frequencies, multiple cable modems and the remote PHY device may use the same transmission band as upstream/downstream bands, as illustrated in FIG. 10. That is, all cable modems ranging from cable modem 1 CM1 to cable modem N CMn may use a frequency band F1 both as an upstream band 1010 and as a downstream band 1020, and the remote PHY device may also use the same frequency band F1 both as the upstream band 1010 and as the downstream band 1020.

Figure 11:
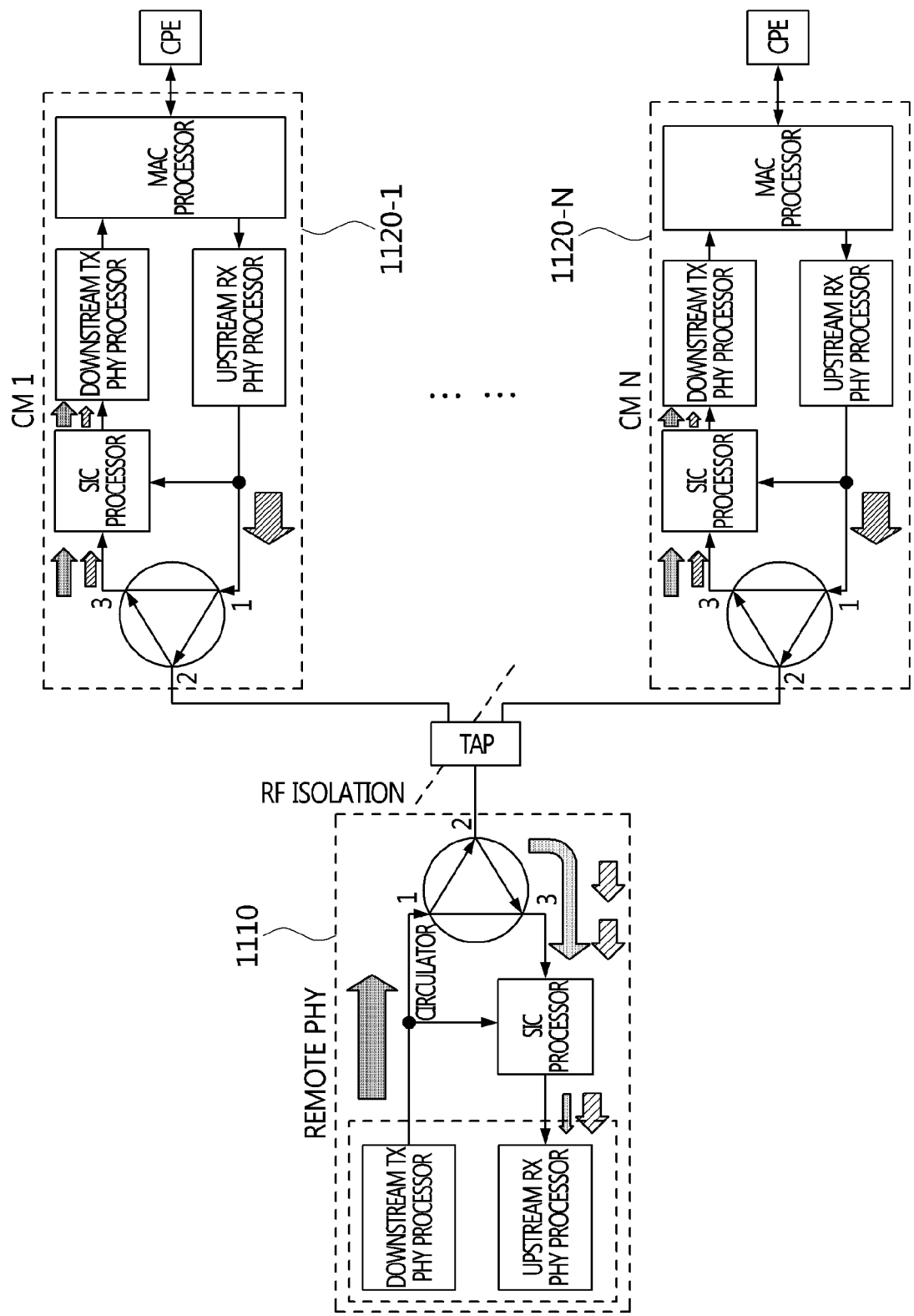
FIG. 11 is a diagram illustrating an example of a procedure in which a self-interference signal is cancelled when frequencies are not divided according to the present invention.

Therefore, when the frequencies are not to be divided, normal signals may be received only when multiple cable modems as well as the remote PHY device cancel self-interference signals, as illustrated in FIG. 11.

Referring to FIG. 11, a remote PHY device 1100 may detect self-interference signals for respective cable modems by comparing a first downstream signal that does not pass through a cable network with a second downstream signal that is input after being combined with an upstream signal based on a circulator.

Here, the procedure of FIG. 11, in which the remote PHY device 1110 detects and cancels self-interference signals for respective cable modems, is the same as the procedure of FIG. 9, in which the remote PHY device detects and cancels self-interference signals for respective groups, and thus a detailed description thereof will be omitted.

Referring to FIG. 11, there is a tap for enabling multiple cable modems 1120-1 to 1120-N to branch off. By means of this tap, an environment for preventing signal interference from occurring between the multiple cable modems 1120-1 to 1120-N may be constructed. That is, when RF isolation is possible between respective branch paths of the multiple cable modems 1120-1 to 1120-N based on the tap, upstream and downstream signals may be simultaneously transmitted/received based on a single transmission band according to the present invention.

Here, each of the multiple cable modems may cancel a self-interference signal by comparing a first upstream signal that does not pass through the cable network with a second upstream signal that is input after being combined with a downstream signal based on the circulator included in the corresponding cable modem.

Figure 12:
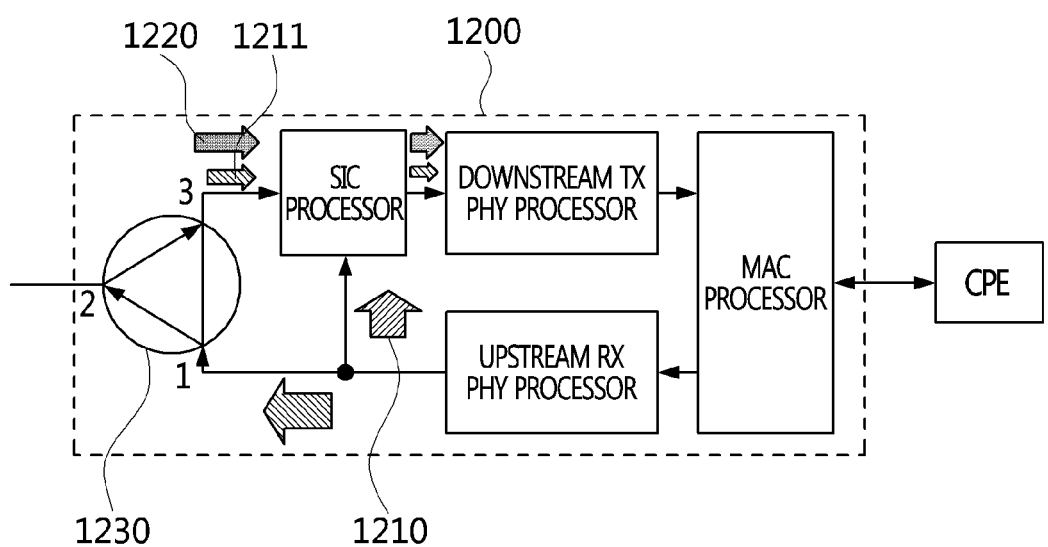
FIG. 12 is a diagram illustrating an example of the detailed structure of a subscriber terminal for cancelling a self-interference signal in the procedure illustrated in FIG. 11.

For example, referring to FIG. 12, the cancellation of a self-interference signal by a cable modem 1200 may be performed by comparing a first upstream signal 1210, which is a reference signal that results from an upstream signal generated based on a processor included in the cable modem 1200 and that does not pass through a cable network, with a second upstream signal 1211, which is output to the cable network through a circulator 1230 and is input after being combined with a downstream signal 1220. That is, the cable modem 1200 may detect and eliminate a self-interference signal based on the first upstream signal 1210 and the second upstream signal 1211, and may then cancel interference occurring when a downstream signal is received.

In this way, the method for simultaneously transmitting/receiving upstream and downstream signals using a remote PHY architecture may be used, and thus an insufficient upstream band of a cable broadcasting network may be effectively extended.

Further, the present invention can extend an upstream band without reducing an existing downstream band, thus doubling the frequency usage efficiency, with the result that a high-quality cable broadcasting service may be provided.

Figure 13:
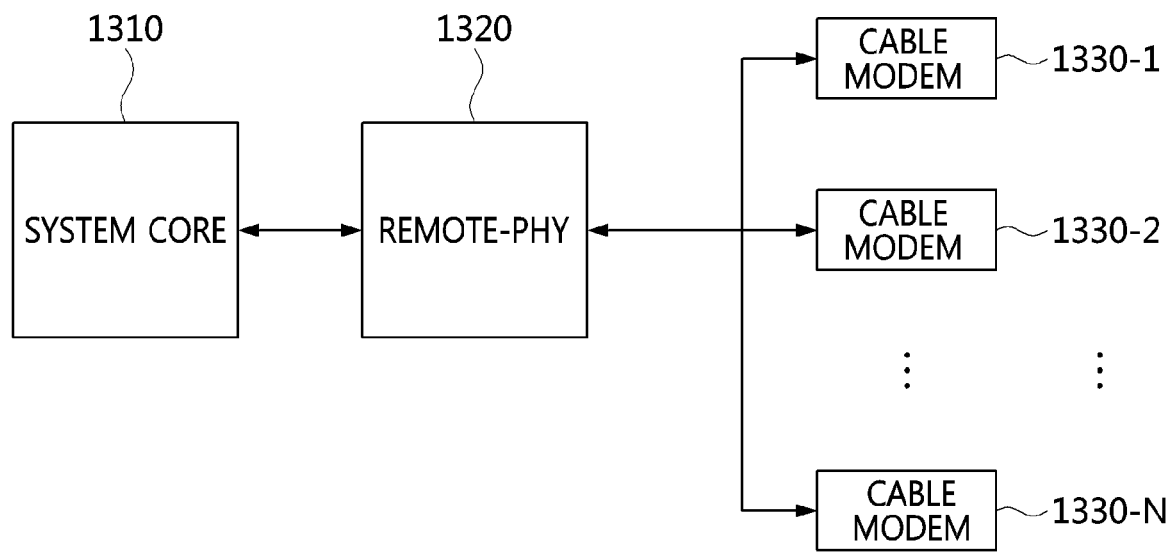
FIG. 13 is a block diagram illustrating an apparatus for simultaneously transmitting/receiving upstream and downstream signals using a remote PHY architecture according to the present invention.

FIG. 13 is a block diagram illustrating an apparatus for simultaneously transmitting/receiving upstream and downstream signals using a remote PHY architecture according to an embodiment of the present invention.

Referring to FIG. 13, the apparatus for simultaneously transmitting/receiving upstream and downstream signals using a remote PHY architecture according to the embodiment of the present invention includes a system core 1310 and a remote PHY device 1320.

First, the system core 1310 located at the headend of a cable network determines whether to divide frequencies depending on whether signal interference occurs between multiple subscriber terminals (e.g. cable modems: CM) connected to a cable network.

Here, each of frequency bands generated by performing frequency division may be used as a transmission band in which upstream and downstream signals are simultaneously used so that upstream and downstream signals from different cable modem groups are simultaneously used, rather than being used as a signal band for any one of an upstream signal and a downstream signal. That is, frequency division according to the present invention may be division depending on whether frequencies in the entire frequency band are to be simultaneously used without separation, or whether frequencies are to be efficiently divided and simultaneously used when there are groups.

For example, as shown in FIG. 4, an upstream band 410 in which upstream signals are transmitted and a downstream band 420 in which downstream signals are transmitted are simultaneously used in the entire frequency band, and thus frequency use efficiency may be doubled. In this case, for efficiency in which signal interference between groups is taken into consideration, divided transmission bands may be allocated depending on cable modem groups.

Here, frequencies may be divided when signal interference attributable to a self-interference signal occurs between multiple cable modems.

Here, a self-interference signal may be a signal produced due to interference caused by a downstream signal when a Cable Modem Termination System (CMTS) receives an upstream signal transmitted from a cable modem (CM) in the same frequency band simultaneously with the downstream signal. Therefore, in order for the upstream signal and the downstream signal to simultaneously use the same frequency, the self-interference signal must be cancelled.

Here, whether signal interference occurs may be determined in such a way that, while any one of multiple cable modems is transmitting an upstream signal, the remaining cable modems other than the one cable modem check whether a self-interference signal caused by an upstream signal is detected.

For example, referring to FIG. 5, a sequential check may be performed on multiple cable modems CM 510-1 to 510-N which are connected to a remote physical layer (PHY) device 520 according to the embodiment of the present invention based on a coaxial network. First during a time period from time t to time t+1, the first cable modem 510-1 may be commanded to generate an upstream signal. Here, the remaining cable modems 511 other than the first cable modem 510-1, among the multiple cable modems 510-1 to 510-N, may check whether a self-interference signal is detected during the time period from time t to time t+1, in which the first cable modem 510-1 generates an upstream signal. In this case, when any cable modem in which a self-interference signal is detected is present among the remaining cable modems 511 during the time period from time t to time t+1, it may be determined that signal interference occurs among the multiple cable modems, and frequencies may be divided.

Here, during the time period from time t to time t+1, when no terminal in which a self-interference signal is detected is present among the remaining cable modems 511, the same procedure may be performed on the second cable modem 510-2. For example, the second cable modem 510-2 may be commanded to generate an upstream signal during a time period from time t+1 to time t+2, and the first cable modem 510-1, instead of the second cable modem 510-2, may be included in the remaining cable modems 511.

In this way, if a self-interference signal is detected in the remaining cable modems while the same procedure is performed on the multiple cable modems 510-1 to 510-N, the frequency band may be divided and used.

Further, if it is determined to divide frequencies, the system core 1310 categorizes multiple cable modems into multiple groups so that signal interference occurs in each group, but does not occur between groups.

For example, referring to FIG. 6, it can be seen that multiple cable modems included in the cable network are categorized into two groups corresponding to group A 610 and group B 620. Here, a self-interference signal may not be produced between the group A 610 and the group B 620.

Here, the Cable Modem Termination System (CMTS) may determine whether to perform grouping, and may then perform grouping. For example, when cable modems in which signal interference does not occur are present among multiple cable modems and then grouping is possible, grouping may be performed.

If there is no cable modem in which signal interference does not occur, among the multiple cable modems, that is, if all cable modems produce self-interference signals, any one of a conventional FDD scheme and a conventional TDD scheme may be used.

Here, the group A 610 and the group B 620 may be generated by grouping cable modems in which a self-interference signal is detected during the procedure for checking whether signal interference occurs, illustrated in FIG. 5. That is, when any one of cable modems belonging to the group A 610 transmits an upstream signal, a self-interference signal may be detected in the remaining cable modems belonging to the group A 610. The group B 620 may also be generated through grouping in the same way.

Further, the system core 1310 divides the frequencies in accordance with the number of groups, and sets transmission bands for multiple groups so that an upstream band and a downstream band of one group alternate with those of other groups.

For example, referring to FIGS. 6 and 7, upstream bands and downstream bands of the group A 610 and the group B 620 may be set to alternate with each other. Here, as illustrated in FIG. 7, a system core may allocate a frequency band F1 to the group A 610 as a group A upstream band 611 for transmitting an upstream signal, and may allocate a frequency band F2 to the group A 610 as a group A downstream band 612 for transmitting a downstream signal. In contrast, the system core may allocate the frequency band F2 to the group B 620 as a group B upstream band 621 for transmitting an upstream signal, and may allocate the frequency band F1 to the group B 620 as a group B downstream band 622 for transmitting a downstream signal.

In this case, as illustrated in FIG. 6, the upstream signal of the group A 610 and the downstream signal of the group B 620 use the same frequency band, and the downstream signal of the group A 610 and the upstream signal of the group B 620 use the same frequency band, but signal interference is not present between the groups, and thus no problem may arise in signal transmission/reception. That is, upstream signals generated from cable modems belonging to the group A 610 may not interfere with the reception of downstream signals by cable modems belonging to the group B 620. Similarly, upstream signals generated from the cable modems belonging to the group B 620 may not interfere with the reception of downstream signals by the cable modems belonging to the group A 610.

However, in the case of the remote PHY device according to an embodiment of the present invention, a downstream signal having the frequency band F1, transmitted to the group B 620, causes interference when an upstream signal having the frequency band F1, transmitted from the group A 610, is received, and thus a self-interference signal for the frequency band F1 must be cancelled. Similarly, a downstream signal having the frequency band F2, transmitted to group A 610, causes interference when an upstream signal having the frequency band F2, transmitted from the group B 620, is received, and thus a self-interference signal for the frequency band F2 must be cancelled.

In this case, Frequency-Division Duplexing (FDD), in which an upstream signal and a downstream signal in each group use different frequencies, is applied to cable modems belonging to the group A 610 and to cable modems belonging to the group B 620, but it can be seen that the use of frequencies from the standpoint of the remote PHY device is implemented such that an upstream signal and a downstream signal are simultaneously applied in the same band. That is, since the upstream bands and the downstream bands of the group A 610 and the group B 620 are alternately used, it may be considered that an upstream signal and a downstream signal are simultaneously used in the same frequency band from the standpoint of overall frequency use.

Here, in FIG. 7, multiple cable modems according to the embodiment of the present invention are categorized into two groups, but the number of groups is not limited thereto, and may be extended to three or more, as illustrated in FIG. 8.

Referring to FIG. 8, it can be seen that transmission bands are allocated such that upstream bands and downstream bands for three groups, that is, group A, group B, and group C, alternate with each other. That is, a frequency band F1 may be simultaneously used both as an upstream band of the group A and as a downstream band of the group C. Further, a frequency band F2 may be simultaneously used both as a downstream band of the group A and as an upstream band of the group B, and a frequency band F3 may be simultaneously used both as a downstream band of the group B and as an upstream band of the group C. Therefore, since signal interference is not present among the group A, the group B, and the group C, no problem may arise in signal transmission/reception.

However, in the case of the remote PHY device, a downstream signal having the frequency band F1, transmitted to the group C, causes interference when an upstream signal having the frequency band F1, transmitted from the group A, is received, and thus a self-interference signal for the frequency band F1 must be cancelled. Further, a downstream signal having the frequency band F2, transmitted to the group A, causes interference when an upstream signal having the frequency band F2, transmitted from the group B, is received, and thus a self-interference signal for the frequency band F2 must be cancelled. Finally, a downstream signal having the frequency band F3, transmitted to the group B, causes interference when an upstream signal having the frequency band F3, transmitted from the group C, is received, and thus a self-interference signal for the frequency band F3 must be cancelled.

Further, the remote PHY device 1320 is located at the Optical Network Terminal (ONT) of the cable network and cancels self-interference signals for respective groups based on transmission bands.

Here, the remote PHY device may mean that functions of a Media Access Control (MAC) layer or higher layers in a conventional Cable Modem Termination System (CMTS) are located at a headend, and that only the functions of a physical layer are separated and located at a remote place.

Here, the remote PHY device and multiple cable modems may be connected to each other over a passive coaxial network that does not include an amplifier.

For example, in a typical cable broadcasting network, a CMTS is located at the headend and is connected to an Optical Node Unit (ONU), which is an outdoor optical transceiver, over an optical network. In this case, a structure downstream of the ONU is a coaxial network, which can be connected to a cable modem through an amplifier, a splitter, etc. However, since network equipment, such as an ONU and an amplifier used in an existing cable broadcasting network, supports an FDD scheme, it may be difficult to simultaneously transmit upstream and downstream signals in the same band according to the present invention.

Accordingly, in the present invention, in order to simultaneously use an upstream band and a downstream band in the entire frequency band, an ONU in the existing cable broadcasting network structure is replaced with a remote PHY device. Here, a network having no amplifier is configured between the remote PHY device and multiple cable modems. However, the distances between the remote PHY device and the multiple cable modems may be limited to a maximum of 300 m or less in consideration of the fact that recent cable broadcasting networks have developed into a fiber-deep architecture in which an optical fiber is extended as close to a subscriber as possible. That is, as cable broadcasting networks have developed into such a fiber-deep architecture, it is expected that the number of cable networks having no amplifier will be gradually increased, and thus the cable broadcasting network according to the present invention may be applied.

Here, the remote PHY device may detect self-inference signals for respective groups by comparing a first downstream signal, which has not passed through the cable network, with a second downstream signal, which is input after being combined with an upstream signal based on a circulator.

For example, referring to FIG. 9, the cancellation of self-interference signals by a remote PHY device 900 may be performed by comparing a first downstream signal 910, which is a reference signal that results from a downstream signal generated based on a processor included in the remote PHY device 900 and that does not pass through a cable network, with a second downstream signal 911, which is output to the cable network through a circulator 930 and is input after being combined with an upstream signal 920. That is, a self-interference signal is detected and cancelled based on the first downstream signal 910 and the second downstream signal 911, and thus interference occurring when the upstream signal is received may be cancelled.

In this case, as each downstream signal passes through elements having nonlinear distortion on a cable system, it may be difficult to completely cancel the self-interference signal, but the self-interference signal is cancelled to such an extent that an upstream signal can be received, thus enabling an upstream signal and a downstream signal to be simultaneously transmitted/received in the same band.

Here, the second downstream signal 911 may be detected through an estimation and modeling procedure. Here, the second downstream signal 911, which is input after being combined with the upstream signal 920, is decreased in magnitude while passing through the circulator 930, but it is not completely cancelled in spite of the decreased magnitude, and thus a self-interference signal for the second downstream signal 911 must be cancelled. For example, the cancellation of the self-interference signal may be performed in an analog domain or a digital domain.

As illustrated in FIG. 9, the remote PHY device 900 may communicate with multiple cable modems, and downstream signals transmitted from the remote PHY device 900 to the multiple cable modems may be transmitted as continuous signals. The multiple cable modems receive the same signal, but each of the multiple cable modems may perform signal processing so that, after signal processing in a physical layer, a Media Access Control (MAC) layer selects and receives only its own data.

However, unlike downstream signals, the upstream signals may be transferred in a burst mode, in which signals are transmitted in respective time slots allocated to the cable modems by a CMTS core.

In other words, upstream signals according to the present invention may be transmitted to the remote PHY device in respective time slots, which are allocated to multiple cable modems by the system core located at the headend of the cable network.

The system core may include functions of the MAC layer or higher layers, and the remote PHY device may include functions of the physical layer.

Here, the CMTS core illustrated in FIG. 9 may be the system core.

Each of multiple cable modems 1330-1 to 1330-N may generally be a terminal device located in a subscriber's premises (e.g. house), rather than being expensive complicated equipment such as a Cable Modem Termination System (CMTS). Therefore, when a function for cancelling a self-interference signal is added to a cable modem, the expense of the terminal may be increased. Accordingly, as in the case of the present invention, a scheme for cancelling a self-interference signal is used only in the remote PHY device, and thus terminal installation costs to be borne by subscribers may be reduced.

Further, if it is determined not to divide frequencies, the remote PHY device 1320 cancels self-interference signals for respective cable modems based on a single transmission band corresponding to frequencies. In this case, the multiple cable modems 1330-1 to 1330-N also cancel self-interference signals produced therein.

For example, if it is determined not to divide the frequencies, multiple cable modems and the remote PHY device may use the same transmission band as upstream/downstream bands, as illustrated in FIG. 10. That is, all cable modems ranging from cable modem 1 CM1 to cable modem N CMn may use a frequency band F1 both as an upstream band 1010 and as a downstream band 1020, and the remote PHY device may also use the same frequency band F1 both as the upstream band 1010 and as the downstream band 1020.

Therefore, when the frequencies are not to be divided, normal signals may be received only when multiple cable modems as well as the remote PHY device cancel self-interference signals, as illustrated in FIG. 11.

Referring to FIG. 11, a remote PHY device 1100 may detect self-interference signals for respective cable modems by comparing a first downstream signal that does not pass through a cable network with a second downstream signal that is input after being combined with an upstream signal based on a circulator.

Here, the procedure of FIG. 11, in which the remote PHY device 1110 detects and cancels self-interference signals for respective cable modems, is the same as the procedure of FIG. 9, in which the remote PHY device detects and cancels self-interference signals for respective groups, and thus a detailed description thereof will be omitted.

Referring to FIG. 11, there is a tap for enabling multiple cable modems 1120-1 to 1120-N to branch off. By means of this tap, an environment for preventing signal interference from occurring between the multiple cable modems 1120-1 to 1120-N may be constructed. That is, when RF isolation is possible between respective branch paths of the multiple cable modems 1120-1 to 1120-N based on the tap, upstream and downstream signals may be simultaneously transmitted/received based on a single transmission band according to the present invention.

Here, each of the multiple cable modems 1330-1 to 1330-N may cancel a self-interference signal by comparing a first upstream signal that does not pass through the cable network with a second upstream signal that is input after being combined with a downstream signal based on the circulator included in the corresponding cable modem.

For example, referring to FIG. 12, the cancellation of a self-interference signal by a cable modem 1200 may be performed by comparing a first upstream signal 1210, which is a reference signal that results from an upstream signal generated based on a processor included in the cable modem 1200 and that does not pass through a cable network, with a second upstream signal 1211, which is output to the cable network through a circulator 1230 and is input after being combined with a downstream signal 1220. That is, the cable modem 1200 may detect and eliminate a self-interference signal based on the first upstream signal 1210 and the second upstream signal 1211, and may then cancel interference occurring when a downstream signal is received.

Figure 14:
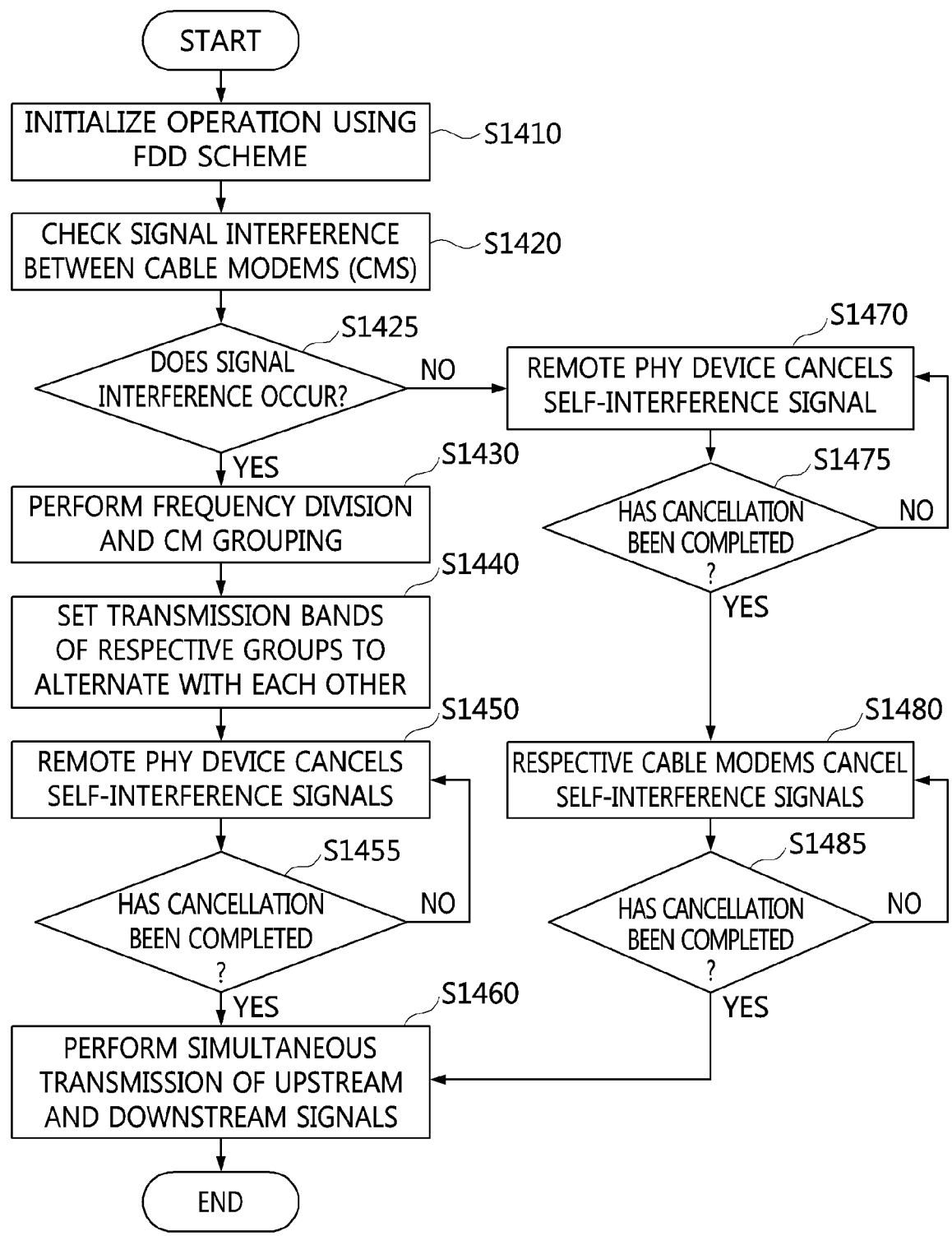
FIG. 14 is an operation flowchart illustrating in detail a method for simultaneously transmitting/receiving upstream and downstream signals according to an embodiment of the present invention.

FIG. 14 is an operation flowchart illustrating in detail a method for simultaneously transmitting/receiving upstream and downstream signals according to an embodiment of the present invention.

Referring to FIG. 14, the method for simultaneously transmitting/receiving upstream and downstream signals according to the embodiment of the present invention may initialize the operation of a system using a conventional Frequency-Division Duplexing (FDD) scheme before the operation of simultaneously transmitting/receiving upstream and downstream signals according to the present invention is performed at step S1410.

Thereafter, whether signal interference occurs among multiple subscriber terminals (cable modems) connected to a cable broadcasting network may be checked at step S1420.

Here, whether signal interference occurs may be checked by determining whether a self-interference signal caused by the upstream signal of an additional cable modem occurs.

Thereafter, whether signal interference occurs among the multiple cable modems is determined at step S1425. If it is determined that signal interference occurs, frequency division and cable modem grouping may be performed at step S1430.

Here, the multiple cable modems may be categorized into multiple groups so that signal interference is present between cable modems belonging to each group, but signal interference is not present between groups.

Thereafter, transmission bands of the categorized multiple groups are set to alternate with each other at step S1440, and a remote PHY device may cancel a self-interference signal at step S1450.

For example, the entire frequency band may be simultaneously used by setting frequency bands such that an upstream band of any one of multiple groups alternates with a downstream band of another group.

Here, the remote PHY device may detect and cancel a self-interference signal by performing processing for cancelling a self-interference signal based on a circulator.

Thereafter, the remote PHY device determines whether the cancellation of the self-interference signal has been completed through an estimation and modeling procedure at step S1455, and may perform the simultaneous transmission of upstream and downstream signals in the same band if the self-interference signal is sufficiently cancelled to such an extent that an upstream signal can be received at step S1460. Here, if it is determined at step S1455 that the self-interference signal is not sufficiently cancelled, the self-interference signal may be repeatedly detected and cancelled through the remote PHY device until the cancellation is completed.

Further, if it is determined at step S1425 that signal interference does not occur among the multiple cable modems, the remote PHY device may cancel a self-interference signal based on a single transmission band at step S1470.

In this case, in an environment in which upstream signals from multiple cable modems are not present, the remote PHY device may cancel a self-interference signal.

Thereafter, the remote PHY device determines whether the self-interference signal has been sufficiently cancelled at step S1475, and respective cable modems may cancel self-interference signals if the self-interference signal has been sufficiently cancelled to such an extent that an upstream signal can be received at step S1480.

In an environment in which downstream signals from the remote PHY device are not present, multiple cable modems may cancel their respective self-interference signals. Therefore, in that case, transmission of downstream signals from the remote PHY device may be temporarily stopped.

Thereafter, respective multiple cable modems determine whether self-interference signals have been sufficiently cancelled to such an extent that a downstream signal can be received at step S1485. If it is determined that self-interference signals have been sufficiently cancelled by respective cable modems, the simultaneous transmission of upstream and downstream signals using the single transmission band is performed at step S1460.

Further, if it is determined at step S1475 or step S1485 that the cancellation of self-interference signals has not been completed, self-interference signals may be cancelled through the remote PHY device or respective cable modems until the cancellation is completed.

In accordance with the present invention, an upstream band may be extended without reducing a downstream band for a cable broadcasting network.

Further, the present invention may provide technology for doubling the frequency use efficiency of a cable broadcasting network.

Furthermore, the present invention may secure competitiveness for a cable broadcasting network and facilitate the provision of a new service, such as a high-quality broadcasting service and a Giga-level high-speed Internet service.

As described above, in the method for simultaneously transmitting/receiving upstream and downstream signals using a remote PHY architecture and the apparatus for the method according to the present invention, the configurations and schemes in the above-described embodiments are not limitedly applied, and some or all of the above embodiments can be selectively combined and configured such that various modifications are possible.

What is claimed is:

1. A method for simultaneously transmitting upstream and downstream signals, comprising:
   determining whether to divide frequencies based on a determination that signal interference occurs among multiple cable modems connected to a cable network;
   when it is determined to divide the frequencies, categorizing the multiple cable modems into multiple groups so that signal interference occurs in each group, but signal interference does not occur between groups;
   dividing the frequencies in accordance with a number of the groups, and setting transmission bands for the multiple groups so that an upstream band of one group of the multiple groups overlaps with a downstream band of another group of the multiple groups; and
   cancelling, by a remote physical layer (PHY) device located at an optical network terminal of the cable network, self-interference signals for respective groups based on the transmission bands,
   wherein the remote PHY device is configured to detect at least one of the self-interference signals for respective groups and self-interference signals for respective cable modems by comparing a first downstream signal that does not pass through the cable network with a second downstream signal that is input after being combined with an upstream signal based on a circulator.

2. The method of claim 1, further comprising:
   when it is determined not to divide the frequencies, cancelling, by the remote PHY device, self-interference signals for respective cable modems based on a single transmission band corresponding to the frequencies; and cancelling, by each of the multiple cable modems, a self-interference signal occurring in a corresponding cable modem.

3. The method of claim 2, wherein the frequencies are divided when signal interference caused by self-interference signals occurs among the multiple cable modems.

4. The method of claim 2, wherein cancelling, by each of the multiple cable modems, the self-interference signal occurring in the corresponding cable modem is configured to cancel the self-interference signal by comparing a first upstream signal that does not pass through the cable network with a second upstream signal that is input after being combined with a downstream signal based on a circulator included in each of the multiple cable modems.

5. The method of claim 1, wherein the remote PHY device is connected to the multiple cable modems over a passive coaxial network that does not include an amplifier.

6. The method of claim 1, wherein in the determining that the signal interference occurs, in a period when any one of the multiple cable modems is transmitting an upstream signal, remaining cable modems, other than the one cable modem, determine whether a self-interference signal caused by the upstream signal is detected.

7. The method of claim 2, wherein the upstream signal is transmitted to the remote PHY device in a preset time slot allocated to each of the multiple cable modems by a system core, located at a headend of the cable network.

8. The method of claim 7, wherein the system core comprises functions of a Media Access Control (MAC) layer or higher layers, and the remote PHY device comprises functions of a physical layer.

9. An apparatus for simultaneously transmitting upstream and downstream signals, comprising:
a system core configured to determine whether to divide frequencies based on a determination that signal interference occurs among multiple cable modems connected to a cable network, and when it is determined to divide the frequencies, categorize the multiple cable modems into multiple groups so that signal interference occurs in each group, but signal interference does not occur between groups, and configured to divide the frequencies in accordance with a number of the groups, and set transmission bands for the multiple groups so that an upstream band of one group of the multiple groups overlaps with a downstream band of another group of the multiple groups, the system core being located at a headend of the cable network; and
a remote PHY device located at an optical network terminal of the cable network and configured to cancel self-interference signals for respective groups based on the transmission bands,
wherein the remote PHY device detects at least one of the self-interference signals for respective groups and self-interference signals for respective cable modems by comparing a first downstream signal that does not pass through the cable network with a second downstream signal that is input after being combined with an upstream signal based on a circulator.

10. The apparatus of claim 9, wherein:
the remote PHY device is configured to, when it is determined not to divide the frequencies, cancel self-interference signals for respective cable modems based on a single transmission band corresponding to the frequencies, and
each of the multiple cable modems cancels a self-interference signal occurring in a corresponding cable modem.

11. The apparatus of claim 10, wherein the frequencies are divided when signal interference caused by self-interference signals occurs among the multiple cable modems.

12. The apparatus of claim 10, wherein each of the multiple cable modems cancels the self-interference signal by comparing a first upstream signal that does not pass through the cable network with a second upstream signal that is input after being combined with a downstream signal based on a circulator.

13. The apparatus of claim 9, wherein the remote PHY device is connected to the multiple cable modems over a passive coaxial network that does not include an amplifier.

14. The apparatus of claim 9, wherein in the determining that the signal interference occurs, in a period when any one of the multiple cable modems is transmitting an upstream signal, remaining cable modems other than the one cable modem determine whether a self-interference signal caused by the upstream signal is detected.

15. The apparatus of claim 10, wherein the upstream signal is transmitted to the remote PHY device in a preset time slot allocated to each of the multiple cable modems by the system core.

16. The apparatus of claim 15, wherein the system core comprises functions of a Media Access Control (MAC) layer or higher layers, and the remote PHY device comprises functions of a physical layer.

17. The method of claim 1, wherein the self-interference signals are detected or canceled by comparing a first reference signal, which has not passed through the cable network, with a second reference signal which is input to the remote physical layer (PHY) device after being combined with a third reference signal based on a circulator.

18. The apparatus of claim 9, wherein the self-interference signals are detected or canceled by comparing a first reference signal, which has not passed through the cable network, with a second reference signal which is input to the remote physical layer (PHY) device after being combined with a third reference signal based on a circulator.

* * * * *